United States Patent
McBurney et al.

(10) Patent No.: US 7,498,983 B2
(45) Date of Patent: Mar. 3, 2009

(54) EXTENDED RANGE HIGH SENSITIVITY SPS POSITIONING RECEIVER

(75) Inventors: Paul W. McBurney, San Francisco, CA (US); William J. Morrison, San Francisco, CA (US); Justin A. Vandegrift, San Francisco, CA (US); Kenneth U. Victa, San Francisco, CA (US)

(73) Assignee: eRide, Inc., San Francisco, CA (US)

( * ) Notice: Subject to any disclaimer, the term of this patent is extended or adjusted under 35 U.S.C. 154(b) by 280 days.

(21) Appl. No.: 11/360,880

(22) Filed: Feb. 23, 2006

(65) Prior Publication Data
US 2007/0057841 A1 Mar. 15, 2007

Related U.S. Application Data

(62) Division of application No. 11/051,761, filed on Feb. 3, 2005, now Pat. No. 7,053,826.

(51) Int. Cl.
*G01S 1/02* (2006.01)
*G01S 5/14* (2006.01)

(52) U.S. Cl. ............................. 342/357.15; 342/357.06; 342/357.13

(58) Field of Classification Search ............ 342/357.02, 342/357.06, 357.08, 357.13, 357.15; 701/207, 701/213, 215
See application file for complete search history.

(56) References Cited

U.S. PATENT DOCUMENTS

| 2003/0130987 A1* | 7/2003 | Edlund et al. ................. 707/3 |
| 2004/0198386 A1* | 10/2004 | Dupray .................... 455/456.1 |
| 2006/0046749 A1* | 3/2006 | Pomerantz et al. .......... 455/457 |

* cited by examiner

*Primary Examiner*—Dao L Phan
(74) *Attorney, Agent, or Firm*—Law Offices of Thomas E. Schaatzel A Prof. Corp.

(57) ABSTRACT

A roving extended range high sensitivity satellite positioning system receiver provides position fixes in adverse signal conditions as low as minus 150 dbm and with as few as three satellites by measuring the bit phase of the navData message and the codephase, and finding a simultaneous solution. Previous position fixes that were obtained in the vicinity by earlier rovers are deposited in an indexed database for consultation. A cellular phone system can be used to simply communicate the current identity codes and their database entries.

11 Claims, 2 Drawing Sheets

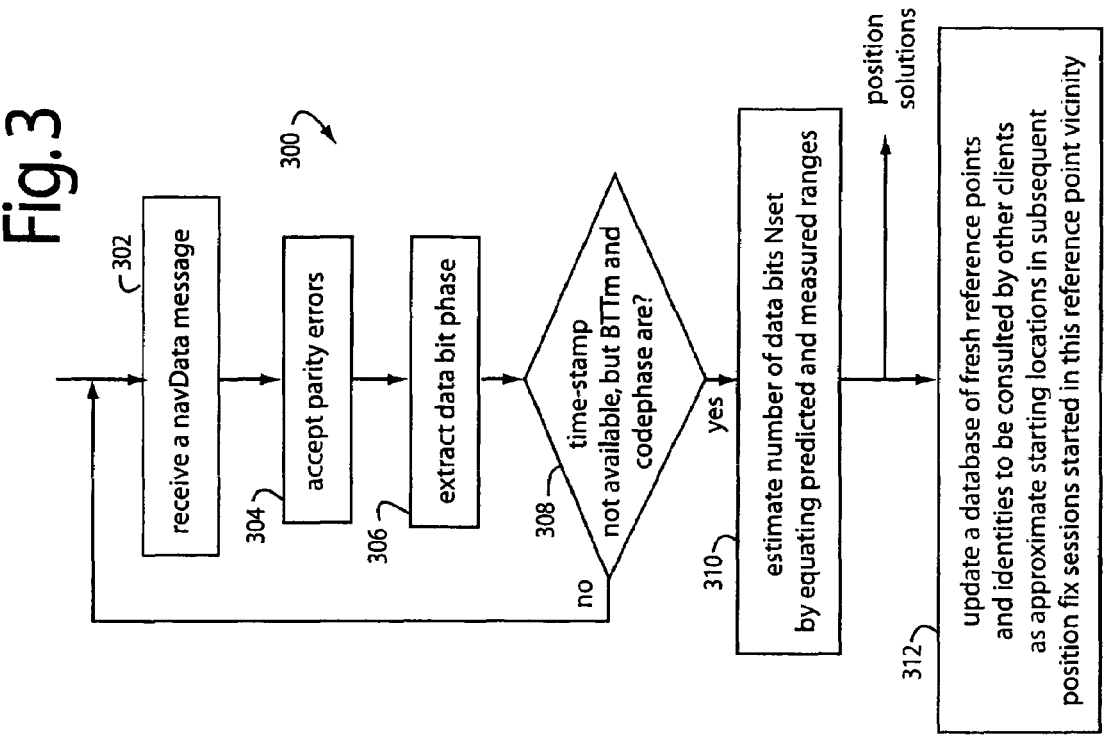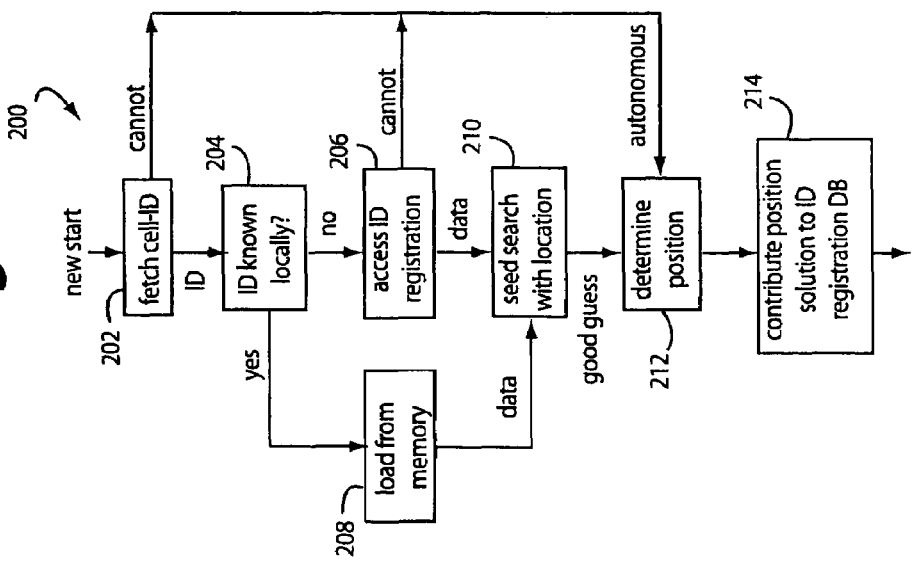

EXTENDED RANGE HIGH SENSITIVITY SPS POSITIONING RECEIVER

RELATED APPLICATIONS

This Application is a Divisional of U.S. patent application, Ser. No. 11/051,761, filed Feb. 3, 2005, now U.S. Pat. No. 7,053,826, issued May 30, 2006.

FIELD OF THE INVENTION

The present invention relates to satellite positioning system receivers, and more particularly to methods and circuits for measuring data bit phase and reference points for extended range high sensitivity.

DESCRIPTION OF THE PRIOR ART

GPS receivers demodulate and range transmissions from orbiting satellites to determine their relative distance to the satellite's location at the instant of transmission. If enough satellites with good geometry can be received, it is possible to make an autonomous standalone determination of the receiver's accurate position. Otherwise, external information will be needed to compute position.

Such externally supplied aiding information can be supplied from a number of sources. So-called assisted-GPS (A-GPS) receiver technology uses the mobile phone infrastructure to minimize the cost/complexity of GPS handset. A-GPS can also make position solutions possible under more difficult satellite signal level conditions. The cellular network signal is very strong in a small region around a cellular base station so a high signal-to-noise-ratio (SNR) can be guaranteed for reliable low bit-error-rate reception. Good signals can support high-data-rate signals for voice, Internet, or data services.

A positioning session starts with a request made by the mobile phone that is sent to the cellular infrastructure. The infrastructure can assume an approximate location for the A-GPS receiver because it will be close to a cellular base station with a known, fixed location. The data communications channel itself is used to communicate important satellite data which has been continuously collected by another GPS receiver beforehand. So the need to demodulate data from the satellite itself is eliminated. However, some of the key ranging information which is the signal reception timing is not received in the A-GPS receiver. However, this can be overcome because it only needs to compute a location very nearby the cellular base station and it can also receive accurate time transfer from the cellular infrastructure.

Thus, A-GPS simplifies the location determination by only requiring the A-GPS hardware to do a small part of the normal SPS signal processing, that is, it must only measure the codephase, which is the part of the range that is less than one cycle of pseudorandom noise (PRN) sequence that is bi-phase modulated onto the GPS carrier signal. The PRN sequence with GPS is 1023-bits long and repeats every millisecond. The geometric range is 60-85-milliseconds, but A-GPS hardware only measures the so-called fractional phase of the range. The data demodulation and the larger part of the range determination are done elsewhere. E.g., inside the cellular communications infrastructure.

Finding the codephase only requires the hardware to test a range of hypotheses of the code phase and frequency of the pseudorandom noise (PRN) signal. Knowing approximate location and time, as well as having an accurate frequency reference and a way to predict the nominal satellite Doppler, will greatly reduce the number of codephase and frequency hypotheses needed. Methods to reduce the search space are well known and are taught by Taylor '118.

A smaller search box means more time can be spent at each hypothesis. The luxury of being able to spend more time can be used to improve the signal-to-noise ratio (SNR). An improved SNR allows the signal to be found in more demanding conditions. Thus at each code and frequency hypothesis, an A-GPS receiver sums the in-phase and quadrature components of the down-converted signal before squaring to form power, and then sums power after squaring. This is called coherent integration followed by non-coherent integration. The variance of these sums decrease with integration time, allowing a power that is above the noise power average to be detected. The standard deviation plus noise average drops below the signal power.

Taylor, et al., U.S. Pat. No. 4,445,118, issued in 1984 (Taylor '118), describe aiding an SPS receiver with an approximate position of a nearby transmitter, e.g., a radio tower or satellite. A benefit of providing such externally sourced information is a faster acquisition time because of the improved starting guess of the satellite Doppler observed at this location. Taylor '118 teaches transmitting the information at a carrier frequency similar to the SPS satellite frequency so both signals can be tuned by the same receiver hardware.

Krasner, in U.S. Pat. No. 6,208,290, (Krasner '290) describes a similar position aiding scheme. A cell-based communication system has an SPS receiver effectively embedded into a cellular network. The aiding improvement is similar to that taught by Taylor '118. The prosecution history of Krasner '290 teaches its SPS receiver and cell-based communications receiver do not share a common communication link.

A cell-based information source, like that described by Krasner '290, gets its aiding information from the cell itself as the data source. Krasner '290 describes a cellular network infrastructure with cell sites and cellular service areas supplemented by a GPS Server. Such is directly connected to the cellular switching center, the land based network, and a query terminal. In this system, a request for service, as a result of an emergency e-911 position request or other service request, enters the network according to the number of cellular mobile subscriber. The response is processed from inside the cellular network infrastructure, which is closed to the general public.

The location determination of the cell base stations or cellular service areas themselves is not specified directly, but it is implied and logical that those positions are determined according to the actual physical layout of the network. For normal operation, all sites are known because they have been keyed into the cell base information source, and thus, can be assumed to be known by the cellular operator. Krasner '290 defines a cell base information source as the cellular communication infrastructure with an embedded GPS server. In this setting, a request for position migrates through different parts of the system so that the approximate position that assists in the position determination comes from inside the cellular network. In effect, Taylor '118 applies to providing information from the point of view of cellular network provider which has access to all parts of the infrastructure, and thus can exploit the characteristics of such a network.

Krasner '290 assumes the client has access to an accurate database for most all cellular base stations at all times of product operation and life.

Demodulating the 50-bits-per-second GPS navigation data message (navData) requires specialized hardware and software capabilities. After finding the signal in the larger search, early-punctual-and late code hypotheses are centered at the best codephase and frequency hypothesis for both the in-phase and quadrature channels of the down-converted signal. Early and late correlators are used to drive a code tracking loop that pushes the punctual code to the top of the autocorrelation peak, e.g., to get maximum signal power and the best estimate of the codephase. The punctual correlators are used to form a frequency error discriminator that eases the frequency error towards zero. The 180-degree phase shifts of the carrier caused by the bi-phase modulation of the navData can then be observed in the frequency error discriminator.

Assisted global positioning system (A-GPS) takes advantage of information obtainable from a cellular based infrastructure that would be useful in a GPS receiver. For example, the Qualcomm A-GPS receiver is low cost and simple because it shares hardware and information between the cellular communication system and GPS receiver. It is not considered an autonomous satellite positioning system (SPS) receiver because the hardware can only measure the fractional part of the total range. It does not demodulate the SPS data message which includes the timing information needed to form a total pseudorange. Instead, it uses an estimated total pseudorange based on the known nearby cell station position. So it can only compute a relative position that is within a circle of the true position. Such has a radius that is one half the theoretical maximum fractional range. In the GPS case for example, the 1023-chip PRN sequence is one millisecond long, which is a ranging distance of roughly 300-km. So the working range is roughly ±150-km around the approximate location.

If the GPS receiver's clock offset from GPS time is not known, then the fractional range measurement is referred to as a fractional pseudorange because it contains the sub-millisecond portion of such clock offset. When the clock uncertainty grows to ±0.5-millisecond, then the relative positioning working range is reduced to only ±75-km because of an ambiguity of whether the addition of the clock bias rolls the fractional pseudorange by plus or minus one millisecond. Such effect is different on each satellite and occasionally it is impossible to resolve if the position error exceeds 75-km. However, in both cases of whether the measurement is fractional range or fractional pseudorange, the 75-km working range is more than the range to typical coverage of cellular base station.

The Qualcomm A-GPS receiver is implemented in one of two embodiments, a Mobile Station Based method (MS-based) that receives a starting position of the nearest cell site and the ephemeris for its visible satellites, or a Mobile Station Assisted (MS-Assist) positioning mode that receives the visible satellites and their expected Doppler. In MS-based, the position is computed in the receiver. In MS-Assisted, the fractional pseudoranges are returned to the network and the position is computed inside the cellular network. In both cases, search time is improved when the Doppler is computed at from the approximate location.

In the A-GPS receiver, the SPS satellite information is not collected in the Mobile Station SPS receiver. Such is both for simplicity and also because the collection is not required with such a tight integration of the SPS receiver and the communication receiver. The SPS satellite data message can always be collected at a remote location connect to the cell-based information source so that satellite position data is available for either method. Also, since the cell station is always within 75-km, additional timing is not needed to form total pseudorange.

The A-GPS receiver derives its time and frequency directly from the cell-based infrastructure. For example, the local oscillator for the SPS signal downconversion and sampling is synthesized directly from the oscillator used to downconvert and lock the to the communication signal from the cellular base station signal. Such removes the need for a separate SPS oscillator and also improves knowledge of the frequency reference for the SPS receiver when the cell base station clock is itself synchronized to an accurate time and frequency standard.

Time is derived from data messages in the cellular communication signal protocol, and can be improved using additional round-trip-time propagation measurements that can be made between the base station and the mobile station.

A-GPS receivers that rely on the cell-based communication receiver downconverter oscillator cannot operate unless the communication receiver is on and is also locked to the base station. Thus a position request requires a handshake with the communication receiver to take it out of sleep mode if it currently in that mode.

The A-GPS receiver is intimately tied to the cellular network and cell-based information source for normal operation. The location services that the network can provide are only enabled by the operator of the cellular network for authorized clients who both have the required A-GPS hardware and are also subscribers to that service. The implication from the embodiments and drawing demonstrate that a position request ripples through many parts of the system. The cell-based information source is not available to non-subscribers.

By contrast, the conventional SPS receiver has its own low cost oscillator and time source, such as a local 32-kHz low power oscillator, and can only determine its time and frequency information by receiving timing information from the SPS satellites. In addition, the conventional SPS receiver must contain hardware that can observe the SPS carrier frequency phase so that data message and timing message on the SPS carrier can be demodulated. Otherwise it has no way to obtain the time data and satellite position data.

The conventional SPS receiver can compute an autonomous fix because it can measure total pseudorange by observing the local time of the reception of transmission timing data in the SPS data message. The total pseudorange is measured as the difference between the received and transmitted time stamp where the received time stamp is the local millisecond time of the received data bits plus the phase of local PRN code sequence where maximum correlation is observed, e.g., the fractional pseudorange. The transmitted time stamp is the value in the data message. Such capability allows the position to be calculated without a known starting reference point. In other words, it can start its searching and position estimation at the any position, such as the center of the Earth. The autonomous receiver has an advantage of being able to fix independent of aiding information. The A-GPS receiver can only fix relative to a known location provided by the cell-based information source.

The cell site position information is not generally available even when using the cellular signal. Currently, most cellular operators closely protect the cell site position information for competitive and business reasons. Access to the cell-based information source described by Krasner '290 is only available through deep integration of the SPS receiver hardware into the mobile phone and cell-based network infrastructure. Even for a device that subscribes to the location base services of an operator, it still does not have direct or independent access to the cell base information source. The MS-Assist method means the relative position does not even need to be sent to the mobile station. Such provides even more security against divulging the cell position.

SUMMARY OF THE INVENTION

It is therefore an object of the present invention to provide a satellite positioning system receiver with extended capabilities.

It is another object of the present invention to provide a satellite positioning system receiver that can operate autonomously if external aiding information is inaccessible.

It is a still further object of the present invention to provide a satellite positioning system receiver that does not depend on a cellular network to generate aiding information.

Briefly, a satellite positioning system embodiment of the present invention comprises a plurality of mobile clients that can move in and out of a wireless service area. Such area is more or less fixed and supported by a base station, e.g., a mobile telephone cell. The service area and/or the base station is associated with an identity code that can be queried. Each mobile client includes an autonomous GPS receiver that does not require aiding information to produce a position fix, but will produce such fix quicker and at higher sensitivity if aiding information is supplied or was previously obtained. A local memory is used to store a limited number of cell-ID identity codes associated with previously determined positions for those sites. The mobile clients further include a cellular telephone that can support Internet access to a mobile aiding server. An ID-registration database is used to collect aiding information collected and contributed in the past by other mobile clients. Such database is co-located with the mobile aiding server and will supply requests for aiding information. When a mobile client enters a new service area and is required to produce a fix, it consults its own local memory and then the Internet server for information related to the particular cell-ID. Such aiding information includes the approximate position of the mobile client, and this reduces the position and Doppler uncertainties.

An advantage of the present invention is that an extended GPS (eGPS) SPS receiver is provided.

The extended GPS (eGPS) SPS receiver architecture has high sensitivity like the A-GPS receiver, and can maintain that sensitivity without the constant aiding required by the A-GPS receiver. It is able to extend its ability to compute position for longer periods that would be possible for a conventional receiver or A-GPS receiver. Also, it can operate much longer in difficult conditions without aiding that is difficult for the A-GPS receiver.

These and other objects and advantages of the present invention will no doubt become obvious to those of ordinary skill in the art after having read the following detailed-description of the preferred embodiments which are illustrated in the various drawing figures.

IN THE DRAWINGS

FIG. 2 is a flowchart diagram of a method embodiment of the present invention useful in the mobile clients of the system of FIG. 1.

FIG. 3 is a flowchart diagram of a navigation receiver method for extending fix ranges under weak signal conditions using a simultaneous solution of the codephase and navData bit phase ranges.

DETAILED DESCRIPTION OF THE PREFERRED EMBODIMENT

Figure 1:
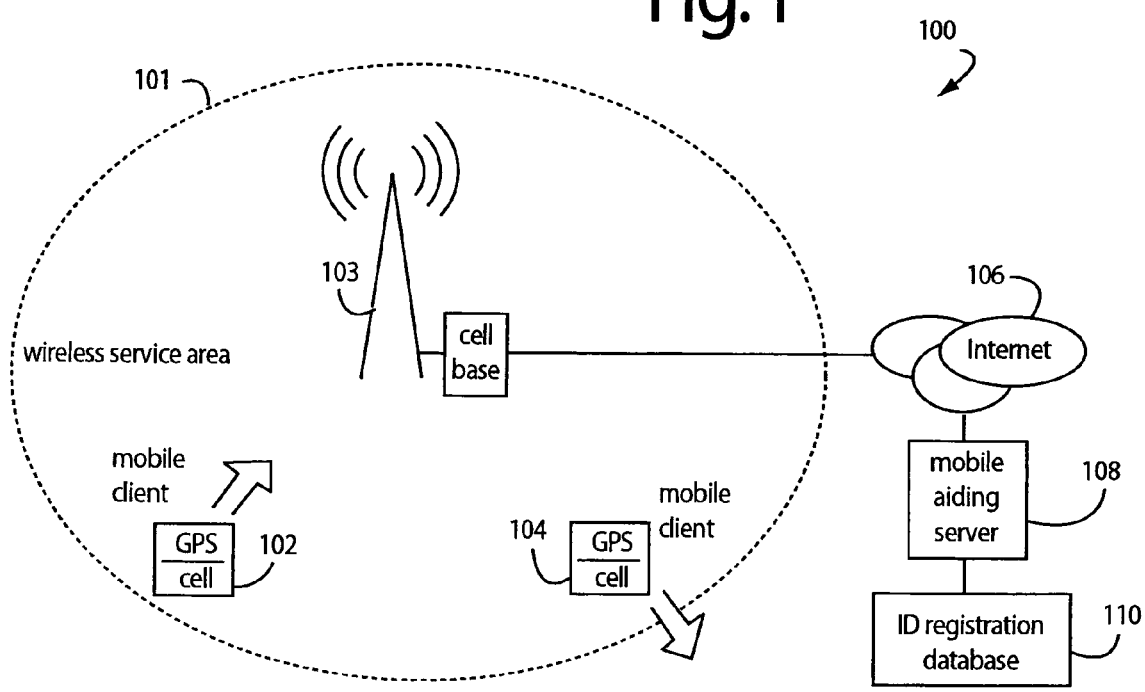
FIG. 1 is a functional block diagram of a GPS receiver system embodiment of the present invention.

FIG. 1 illustrates a GPS receiver system embodiment of the present invention, and is referred to herein by the general reference numeral 100. System 100 includes a wireless service area 101 that hosts an entering mobile client 102 and a fixed-location base station 103. A departing mobile client 104 has already computed a position fix. It communicated its position solution and an identification code for base station 103 over the Internet 106 to a server 108 which maintains a registry database 110. Alternatively, the service area 101 can be identified and associated with the position solution. Each mobile client 102 and 104 includes, for example an autonomous GPS receiver and a mobile telephone. The mobile telephone part can provide Internet access for the GPS receiver part. Other positioning system receivers are possible, e.g., GLONASS and Galileo. Other wireless communication systems are also possible besides cellular, e.g., WiFi, Bluetooth, police/fire/ambulance dispatch radio, etc.

In a cell phone embodiment of the present invention, system 100 determines and distributes approximate positions of cell sites to mobile clients, e.g., 102 and 104. The cellular network is used only as an Internet access point. The cellular network itself does not supply the approximate position, e.g., as is described and depended on by Krasner '290. The cellular network therefore need not be trusted to supply a correct position estimate. In a larger sense, a mobile telephone network is not even required.

Mobile clients 102 and 104 have an extended global positioning system (eGPS) SPS receiver that, if needed, can compute an autonomous position without aiding from the network. For purposes of illustration, mobile client 104 is assumed to have already computed a position fix and is leaving service area 101. It may have already left. There may also have been no previous visits, or there may have been many visits. After computing its fix, mobile client 104 makes a continuous attempt to connect to the Internet through the cellular network. If successful, it then attempts to obtain a cellular identity (ID) so that an association between the ID for base station 103 and its most recently computed position can be registered.

During a next position solution attempt, the uncertainty of its last computed position and the uncertainty of the position associated with the most recently read cell-ID are computed. If mobile client 102 does not know the position associated the current cell-ID, and the two uncertainties exceed 150-km, it connects to the position registration server 108 to see if a mobile client 104 has already computed and registered a position for that cell-ID. If at least one other client 104 had fixed in service area 101, the approximate location and its uncertainty model are available to mobile client 102.

The nature of the cellular system is unimportant. Such only provides an Internet communication and a local contact station with a fixed location having a relatively short range, e.g., under 150-km. The present invention will therefore operate with any mobile communication system that employs fixed base station and can carry an Internet connection. WiFi hotspots and other such wireless networks are examples. The cell-ID's can instead be Internet TCP addresses, especially if they are fixed and associated with particular locations and subscribers.

A mobile client 102 begins its search for satellite signals using an approximate position with the smallest uncertainty. Each mobile client 102 applies pre-fix procedures to prepare the measurements before computing. A position with different sensitivity levels is computed according to the uncertainty, and the types of measurements it is able to obtain from the duration of the position attempt session.

Compared to Krasner '290, system 100 does not rely on access to proprietary cellular network information. It may very well be necessary for a cellular operator to conceal or obscure the true locations of its base stations to avoid terrorist and vandal attacks on the important infrastructure. Database 110 can be configured to accept data from only trusted and verified sources.

FIG. 2 represents a method embodiment of the present invention, and is referred to herein by the general reference numeral 200. The method 200 is implemented as software on mobile clients 102 and 104. A step 202 begins with the mobile client trying to obtain an identification (ID) code from the cell base 103. If an ID is obtained, it can be used as an index to a database of previously determined positions. A step 204 checks to see if the need for a particular ID and its associated aiding information were anticipated and preloaded in local memory. If not, a regional, national, or worldwide database needs to be consulted. A step 206 attempts to log-onto the Internet 106 and access server 108. If the log-on is successful, database 110 is indexed with the ID. If a mobile client 104 had previously computed a fix, then database 110 will have it to supply the request of mobile client 102. A step 208 supplies a locally stored aiding information. A step 210 uses the data fetched to seed a signal search. A step 212 determines position, either autonomously or with help. If the aiding information is accessible, then the step 212 can proceed to provide a result more quickly and at higher receiver sensitivity. In any event, a step 214 contributes the position solution obtained to the database 110 for use later by others, or its own revisit. It may be worthwhile for a mobile client 102 and 104 to store all the aiding information locally too it has generated, on the assumption it is likely to revisit places it has been before.

At the start of worldwide deployment, the number of known reference points will initially be small. The volume will grow over time and as a function of the success of the commercial products. Krasner '290 assumes the client has access to an accurate database for almost all cellular base stations at all times of product operation and life. So a database is not needed as each cell-site is self-identified.

Typically, a mobile client 102 can communicate with many cellular base stations 103, the cellular switching system controls which cellular base station is used at a particular time. Additional information inside the network can be used to predict the approximate location more accurately than with a single cell site in the approach. The strongest signal is not always the closest, e.g., due to obstructions or because the closest tower is busy. But this information can nevertheless be used by the cell-based information system. The actual cell site positions can be defined more accurately by the cellular infrastructure, since it knows the exact location of the towers. It can derive an accurate position from a survey or a map. Other SPS receivers with access to cell-based information sources use methods for faster and lower power consumption position session. These take advantage of the cell site density in producing a more accurate approximate position.

System 100 can be less accurate in providing the approximate locations, compared to those obtained directly from a cell base information system. As a result, it employs a more demanding and complex relative positioning method to manage a potentially large position uncertainty. In the Krasner '290 approach, the position uncertainty is always minimal because it only attempts a fix when it is in contact with a cellular base station where the position is assumed to be accurately known. However, because the SPS receiver 102 is autonomous, and is required to have extended GPS capabilities, any degradation in the approximate location associated with the cell site can be managed. The highest sensitivity positioning can be maintained, as long as it operates where it or other eGPS receivers have operated in the past.

The system 100 may require stronger signals in a new area to get its very first fix, but will thereafter improve its sensitivity as long as it can remember this cell-ID and the position it computed.

Each receiver 102 and 104 uses a conservative error growth calculation to estimate a worst case error in the parameters. For short periods of off-time, the error grows according to an acceleration model. For consumer applications, an acceleration $a=0.25$ to $0.5$ g (where $g=9.81$ m/s/s) is a reasonable value. Constant acceleration is reasonable until the velocity growth hits the worst case velocity (maxUserVel) which is a parameter tuned for the particular application.

Thus, until maxvel is reached, $$\text{VelUnc} = \text{FixVelUnc} + a*dt$$

$$\text{Punc} = \text{PfixUnc} + 0.5\, a*dt*dt$$

Where $dt = t(\text{now}) - t(\text{last fix})$

After maxVel is reached, $$\text{VelUnc} = \text{maxUserVel}$$

$$\text{PosUnc} = \text{Punc}(\text{maxVel}) + \text{maxUserVel}*dt$$

Where Punc(maxVel) is the value of the position uncertainty when the maximum velocity was calculated.

A similar model is made for the time and drift uncertainty.

$$\text{DriftUnc} = \text{DriftFixUnc} + \text{driftRate}*dt$$

$$\text{BiasUnc} = \text{BiasFixUnc} + \text{integral}(\text{DriftUnc})$$

Where driftRate is a function of the stability of the oscillator with time, and the time uncertainty integrated this value. If a temperature sensor and a drift verse temperature model are available, the error growth rate for the drift and bias uncertainties can be modeled.

A worldwide reference point database 110 is accumulated over time in a business model embodiment of the present invention. By sharing computed positions and cell-identities (ID's) with the position registration server 108, a worldwide set of reference points can be constructed. Such provides each mobile client 102 with high sensitivity position capability in any cellular network where a cell-ID is readable in the available in the unprotected communication protocol. Other forms of identifying the fixed base station could be used, it is not necessary that only cellular station or cell-ID's be acquired or registered.

Initially the position registration server 108 starts with no database of reference points. These points are referred to herein as "breadcrumbs", after the fairytale story. Such telltale a place that has been encountered before. When product shipments begin to new clients, the receivers will have an empty database 110. However over time, such mobile clients 102 and 104 will compute autonomous fixes and begin to communicate periodically with the position registration server 108. As part of a setup procedure or a pre-travel preparation, a client receiver can connect to the position registration server 108 via the Internet. A simple selection process is used to request reference points for places it intends to operate. Such as places near a primary residence or places it intends to visit. In the early phase of a product roll-out, such requests will not yield a great number of points in response. However, over time, as the number of autonomous fixes performed in the mobile client 104 in the field grows, and more points of interest are defined, the position registration server 108 and database 110 will also grow to be quite extensive.

As a business model method to grow the position registration database 110 faster, a contest can be used that motivates clients to operate their GPS receivers in conditions that allow reliable autonomous location determination and then to logon periodically to the position registration server 108 to share their points. They are rewarded more for being the first client to operate in a new region and provide the information to the position registration server 108. They are rewarded proportionally less when they provide information for points already supplied but yet still help to improve the accuracy of an aggregate position supplied by other contestants for a given cell-identity or breadcrumb. Once that position estimate has converged to a satisfactory non-varying average, the contest for that cell-identity or breadcrumb is closed.

Thus, just as a mobile phone can store phone numbers, it can store "breadcrumbs" of places it wants to go or has been. Algorithms for minimizing the number of "breadcrumbs" are implemented in the client to minimize the amount of memory required. For example, a single position may have a long list of cell-identifiers that are within a tolerable range of the position so that the breadcrumb position is within 75 or 150-km of the true position. The goal is to store one position that contains the most cell-ID's within that region. Such is common when there are many Cell-ID's coming from the same cellular base station. If the client reads a new cell-ID a short time after computing a fix, it can associated the new cell-ID with the previous fix and also create an uncertainty for this cell-ID which is the uncertainty of the previous fix plus the uncertainty growth due to receiver movement since the fix. In this way, the receiver does not have to be fixing continuously, but the modem can continue to interrogate for new cell-ID's.

Similarly, the cell-ID's may not always be completely unique in a worldwide sense. The position registration server 108 hosts algorithms that manage the master database 110. It is possible to have more than one of the same ID's, but generally they will be in different geographic regions.

If a client enters an area for which is has no "breadcrumbs", it may be able to do an autonomous position and therefore create a new breadcrumb at the current cell-ID that it can subsequently share this with the position registration server 108. If it is not possible to fix, it can send the current cell-ID to the position registration server 108. It also sends along its most recent position, time tag, cell-ID, and the current configuration for the maximum velocity it can experience in normal operation. If the server 108 has that ID and it is unique, then the server can confidently send the position for this cell-ID to the client 102 along with a configurable number of additional "breadcrumbs" around this area. The number depends on the time till next communication. If the client requests often, only a few "breadcrumbs" around the current one are needed. If the client requests rarely, a larger reply may be sent. In a constant-on operation, the server could send the points surrounding the current location and the client can continuously trim the previous "breadcrumbs" to minimize the storage.

If the ID is not unique, the server can check the position for reasonableness of being in proximity of the multiple positions in memory for this ID. The maximum distance that can be traveled since the last fix can be calculated produces a circle around the last position. As an even more conservative check, the speed of the fastest executive jet can be used to predict the maximum range for the last position. If this circle can be used to identify the obvious position for the redundant cell-ID, then the client is sent the breadcrumb. However, if there is ambiguity, the server will not reply with a position and the mobile client 102 will be required to do an autonomous fix or wait for the signal conditions to improve.

An ambiguity between two possible cell-ID locations can be resolved by looking at the last fix and deciding which is nearest. The nearest is most likely correct.

$$DelPos=maxVel*(timeNow-timeFixAtCellID1)$$

In an experiment, an Enfora GSM modem was used to make contact with a position registration server via the Internet on a test drive from San Diego to San Francisco Calif. on Jan. 2, 2005. The modem was powered on every 100-seconds and the cell-ID and location area code parameters were read from the modem. Each time a cell-ID or location area code changed, a new position was saved and the distance from the first position at the last Cell-ID was computed.

What was learned was cell-ID's can change very quickly. Such could be due to handoffs between different antenna at the same location, e.g., a change in orientation that changes quickly as the vehicle approaches or passes by a tower. Storing a cell-ID alone produces too many points that are probably not unique identifiers.

Location area codes change much slower. The range covered by an location area code is much larger. In one case, a location area code was valid for 186-km=115-miles. The one sided range is about 58 miles or 93-km.

In embodiments of the present invention, the approximate position in eGPS system never comes from the cell-based information source, e.g., in contrast with the cellular network described in Krasner '290. Instead, it comes via the Internet from server 108 that is independent of cellular network provider. It cannot access the cell-based information source known to the cellular network only. Furthermore, the position database is grown by the customer operation, not by the cellular network provider.

The preferred SPS receiver has many of the characteristics of a conventional receiver in that it can obtain all the timing information in the SPS data message. Like a conventional receiver, it can fix autonomously with no aiding information using the timing information in the data message to form a total pseudorange measurement. It also has the high sensitivity of an A-GPS receiver and can still extract the codephase below where the signal is too weak to extract any larger wavelength timing information from the signal. With the wavelength of the codephase at one millisecond, there is only ±0.5-millisecond (±150-km) of measurement observability of the total pseudorange which determines how far it can move the position estimate from the starting value. The extended GPS (eGPS) receiver can extend its fix range far beyond the 150-km radius in signal conditions where it is able to also extract the data bit phase of the data message, even when it might not be able to decode the data bits themselves without parity errors. With GPS, the 20-milliseconds wavelength of the data bit produces a half cycle ambiguity of ±10-millisecond. With this larger wavelength measurement, the range of position in weak conditions can be extended from the range of the codephase at 150-km out to 1500-km (940-miles) and beyond that from an approximate position.

Using "breadcrumbs" or reference points, the eGPS receiver bounds its starting position uncertainty and maintains high sensitivity fixing whenever it returns to an area where it has previously computed a position and can associate that position with an unique identifier that can be communicated automatically or by human intervention. The eGPS receiver builds its own database of reference points. Bread crumbs are collected at the position registration server 108 where they then can be shared with other eGPS receivers.

Cellular communications cellular base stations are one such Type of reference point since a cellular modem can generally read the cell-identity in the normal communication protocols without using the cellular based information source.

A method of operating the mobile client 102 and 104 for extending its capabilities is firstly to obtain the most timing information possible from the SPS signals, even in weak signal conditions, in order to fix autonomously with the highest level of uncertainty in its starting position. Secondly, when it is able to fix, it updates a database of fresh reference points and identities. These are thereafter used as approximate starting locations on subsequent fix sessions started in the vicinity of the same reference point.

The receiver should have a millisecond clock used as the reference for the codephase measurement. Its time error can be expressed as the sum of an integer error in the time of the millisecond event and a sub-millisecond offset between the receiver millisecond event and the true SPS millisecond time. The bias is the true time (±0.5-millisecond) difference between the receiver millisecond counter and SPS time. The true range (Rtotal) is the distance between a satellite and a receiver, also expressed in integer and fractional-milliseconds (Rint, Rfrac). The choice of using the millisecond event as the main time step comes from the GPS case where the satellite pseudo-random-noise sequence (PRN) repeats every millisecond. The codephase is a positive number between zero and one millisecond as the time between the received PRN epoch and the SPS receiver millisecond event prior to the received epoch (defined as msecEpoch).

If Rtotal is known, one equation can update two variables because bias and msecAdjust can be solved for by isolating the integer and fractional components.

Summarizing, biasEstimate=fractional part {SPStransmitTime+Rtotal−msecEpoch− codephase} msecAdjust=integer part {SPStransmitTime+Rtotal−msecEpoch−codephase}.

MsecAdjust and bias can be estimated even if an approximate position only is available. A resulting estimation error is proportional to the error in estimated range to the satellite. The error is introduced in the estimated range (Rapprox) and it produces exactly the same amount of time set error in the adjustment variables msecEpoch and biasEstimate. The amount of actual position error that would create this range error depends on the geometry.

Even with a clock bias, the error in the time setting of msecAdjust and the estimated bias is dependent only on the error in approximate range, which itself is dependent on the error in the position.

Three types of timing measurement for an SPS satellite can be defined:

| | |
|---|---|
| Type-1: | total measured pseudorange using the received time message in SPS data message, data bit phase (BTT), and measured fractional pseudorange (codephase); |
| Type-2: | data bit phase (BTT), and measured fractional pseudorange; and |
| Type-3: | measured fractional pseudorange only. |

The pseudorange (PR) can also be represented as the sum of an integer millisecond range and a fractional millisecond range. In GPS, the PRN repeats every millisecond and a typical value is 60–85 milliseconds. An SPS receiver generates zero codephase when its local PRN epoch occurs at the same time as the millisecond clock.

The fractional range is measured as the PRN codephase between zero and one millisecond where there is maximum correlation between the locally generated PRN code and the incoming signal. Because the wavelength of this signal is relatively large, the codephase by itself can provide an unambiguous relative positioning capability of ±150-km around an approximate position. But only when that position is within this range of the true position. A full measured ranging capability is only possible by receiving the SPS satellite timing message that measures the true integer range. So unlike with only the codePhase, an approximate location is not needed to obtain a position. For example, (0,0,0) can be used.

In the GPS case, the time message contains the z-count which provides the GPS time of a known bit in the data sequence. Having this time reference means the time of any other data bit can be predicted. So the usage of z-count can express the time of any specific data bit.

| | |
|---|---|
| Pseudorange | = measured reception time − satellite transmission time |
| | = (msec of received z-count + codephase) − (GPS msec of z-count) |

The measurement can also be represented as having an integer and fractional portion (in units of milliseconds).

Pseudorange=integer msec+codephase(msecs)

When the data bit is 20-milliseconds long, the integer millisecond (intmsec) can also be written in terms of the number of integer data bits (N) and the fractional data bits phase (BTT): intmsec=N*20+BTT When z-count is available (a Type-1 measurement), Nzcount is the number of total data bits in the pseudorange constructed from the received z-count. The z-count is the part of the integer millisecond range that is multiples of 20. The $BBt_m$ is the measured sub-20-millisecond data bit phase, and measured codephase makes the fractional millisecond part:

Pseudorange measured=$Nzcount*20+BBt_m$+ codephase

When a z-count is not available, but a measured $BBt_m$ and codephase are available (such as with a Type-2 measurement), then N can be estimated from an approximate time and position. In this case, the number of data bits $N_{set}$ is estimated instead by equating the predicted range to the measured range. Such is formed by removing the estimated receiver clock bias from the measured pseudorange.

Codephase=$R$frac−bias.

Predicted range=$N_{set}*20+BBt_m$+codephase+biasEstimate

Thus, $N_{set}$=round to nearest integer[(predicted range−$BBt_m$− codephase−biasEstimate)/20].

$N_{set}$ is calculated correctly as long as the interaction of the time error and the position error do not combine to make more than 10-millisecond of error in the estimated pseudorange. The position error couples through the estimated range error and the time error manifests in the time-tag of $BBt_m$.

An ambiguity function is evaluated to determine if the N estimate can be trusted.

The error in the estimated range and the error in the receiver time appear with opposite signs. Thus, by inspection, N calculates correctly when,

|ErrorNset−ErrorTimeSet|<10, where errorTimeSet is the error in the satellite vehicle (SV) time set and ErrorNset is the error in the $N_{set}$ process.

The time set error is only a function of error in the predicted range. The common mode error of the predicted range equals the time set error when the correct N is calculated. The size of the clock bias does not affect the time set error or $N_{set}$ error. |ErrorNset−ErrorTimeSet| defines whether the N can be calculated correctly or not.

The integrity of the estimated total pseudorange is determined by the ambiguity function. When the receiver time is set by a Type-1 measurement, then ambiguity function says to:

Trust $N_{set}$ if |RangeErrorNset−RangeError-TimeSet|<10, else, don't trust $N_{set}$.

If the maximum position error is less than 5-millisecond, then the maximum range error in either of these terms is always less than 5-millisecond, and so the ambiguity function can never be larger than 10, meaning that $N_{set}$ always calculates correctly.

When the position error is larger than 5-millisecond, the ambiguity range depends on the relative geometry between the time-set and N-set satellites. If they are more normal to each other, there will be more common error between then, leading to less error in $N_{set}$. Conversely, if they are more orthogonal, the error will be less common between them, leading to more error in $N_{set}$.

With only one Type-1 measurement for time-set, the best situation may be when the time-set is the highest elevation since it will have the least amount of horizontal position error. So, the lower elevation satellites are able to use up the rest of the 10-millisecond minus the error in the time-set SV. However, in case there are more than one Type-1 measurement, the best case is when the Type-2 satellite is more normal to the time set satellite so that the range difference will be more smaller, yielding a lower ambiguity result. In case there are enough high elevation SV's, it is possible that the position error can grow past 10-millisecond and the ambiguity function can still be less than 10-millisecond, meaning that the range of position error can be larger than 10-millisecond.

A fix with such a high elevation satellites will generally have a higher position dilution of precision (PDOP) and error than can be tolerated for a consumer expectation. The fix is generally accurate enough to allow the higher sensitivity Type-3 measurements to be added in a second fix that uses the first fix as the starting point. Such two step process is referred to as self-aiding.

When the receiver time is maintained by a real time clock (RTC) or any continuously running oscillator and when there are no Type-1 measurements available, then $N_{set}$ can still be estimated in a similar way. The time error cannot be measured directly in this case so a model of the time uncertainty Tunc is used as an upper bound on its contribution to the N estimate. However, the ambiguity function changes to:

Trust $N_{set}$ if |rangeErrorNset|+|Tunc|<10, trust $N_{set}$, else, don't trust $N_{set}$.

The GPS navData message has a rate of 50 bits-per-second. Each bit is 20 milliseconds long and a new navData bit leaves the satellite synchronously after 20 PRN's are transmitted. For a typical range to the satellite of 76-millisecond, there are three total bits of distance and then a fractional part of a data bit that is sixteen epochs out of twenty complete.

The process of measuring the BTT involves determining the state of a 20-millisecond counter that defines the GPS millisecond when the received data bit changes. The start of the current incomplete data bit is BTT-milliseconds earlier than the millisecond of the current epoch, but offset from the millisecond by codephase. Adding this additional event time extends the range over which position can be computed from the level provided by codephase, from ±150-km up to ±1500-km. A method for determining an accurate estimate of BTT for a weak signal is needed to gain this extension.

To estimate BTT, a phase reversal test statistic is formed for each epoch hypothesis from 0-19 for the location of the BTT. The test statistic is the dot product detector based on a series of correlator sums of the in-phase and quadrature data. In order to observe the data bit phase reversals, the locally generated frequency must be within 25-Hz of the true frequency. In conventional receivers with strong signals, this is done with an AFC or PLL loop. For weak signals, eGPS receiver embodiments of the present invention use a high sensitivity code and frequency tracking loop. These are driven by a strongest signal from the search window with a multitude of codephase and frequencies hypotheses from long non-coherent integrations times. The frequency spacing between hypotheses is small enough to reduce the frequency error. The inputs to the BTT estimation algorithm are the consecutive one millisecond in-phase and quadrature correlation results at the code and frequency loop state.

Every 20-milliseconds, twenty test statistics for the data bit phase are evaluated that use the in-phase and quadrature sums from two consecutive time windows. For the highest sensitivity, the time windows are each 20-millisecond. If the consecutive sums in each leg have a different sign, then the product will be negative indicating a potential data reversal.

A histogram with twenty elements corresponding to different BTT hypotheses is defined to integrate counts of events when the dot product at a given BTT hypothesis is negative. BTT is declared found when the histogram count at a particular BTT hypothesis reaches a confident value above the other candidates.

The BTT location is then converted to GPS time by associating the BTT location with the sum of the codephase plus the GPS-millisecond counter nearest to the epoch location of the winning BTT histogram.

After the BTT is determined, the navData is demodulated by forming another dot product test statistic at the best hypothesis of the data bit phase. The Ibtt(k−1), Ibtt(k), Qbtt(k−1), Qbtt(k) sums are already formed to continue to update the BTT histogram result. Then these data are used to identify the actual data reversals of the navData message itself. Initially, the first data bit for I(k−1), Q(k−1) is declared arbitrarily to any value: typically 0 is chosen. Then if the test statistic using I(k), Q(k) is negative, indicating a reversal, then the second bit is declared a one. Otherwise it is declared zero. Then the time index is moved by 20-millisecond, so that Q(k−1)=Q(k), I(k−1)=I(k), and a new set of data is collected for I(k), Q(k) to get the next bit, and the process is repeated.

When the signal is weak, the reversals might be declared falsely because a sign change can occur randomly when the signal is weaker than the noise. As the signal decreases, the dot product result is more often wrong due to noise in the correlator results. The 50-bps data is not done reliably, it wont pass parity.

However, the data bit phase is not a single event like the data, it keeps occurring, so the BTT histogram has the luxury of being also to integrate for a long period to average out the noise. As long as the signal is above the noise average, the histogram will eventually find the correct BTT when enough data is observed. Of coarse, the noise will cause the noise floor of the histogram to grow, but the true location will win if integrated long enough. A histogram up to 16-seconds can be used so that BTT can be estimated down to −150 dBm or lower. Typically, the data message can only be demodulated confidently down to a received signal strength of −145 dBm.

After decoding the raw navData bits, the receiver commences a process of extracting the real message from the bits. It first looks for the preamble, which a fixed value of 0x8 B in hexadecimal, or its complement in case the arbitrary starting phase is flipped from the true phase. After finding preamble, it forms a 30-bit word and computes the parity of twenty-four data bits and compares them to the 6-bits received parity bits. If they agree, it decodes the next 30-bit word as the HOW (hand-over-word) which contains the 17-bit z-count. Such variable gives the exact transmission in GPS time of the first bit of the next subframe which will occur after eight more words.

The integer millisecond portion of the total pseudorange is measured by comparing the observed reception time of the z-count to the value itself. For example, the receiver time tags the received bits with respect to its local GPS-millisecond clock. It can then predict at what time it will receive the first bit of the next subframe because each bit is 20-milliseconds. The difference in the predicted reception time and actual transmission time yields the intmsec range. For example, if the z-count itself says the time will be 6.0 seconds, and the true range plus the time error is 73.5-millisecond, the observed reception time of will have integer millisecond counter time tag will be 6073-milliseconds and a codephase of 0.3-millisecond. The integer millisecond range is 6073-6000=73 and the total measured pseudorange is 73.3-millisecond.

Because z-count can only be observed no faster than every six seconds, BTT is often used to estimate the sub 20-millisecond portion of the intmsec because the codephase can roll-over or roll-under after the lost observation of the z-count. Codephase is the non-linear truncated part of the total pseudorange than has to have a value 0-1 millisecond. Roll-over occurs when the codephase is increasing, and rolls over from a value close to a millisecond value and to a value near zero. Roll-under is the opposite case when the value is near zero, and decreases and wraps from a small value to a value close to a millisecond. However, because a signal can become weak, and disappear periodically, it may be difficult to observe z-count again, and thus, correcting the intmsec for roll-over can be difficult. For this reason, BTT is needed to keep the absolute part of the intmsec in agreement with the current codephase. Thus, BTT estimation is a continuous process.

A GPS receiver that starts with no information from a cold start will set its clock from the first z-count by using a guess of the integer millisecond around 72-milliseconds since this is the average intmsec. Such sets the time accuracy to roughly ±13-millisecond.

When the receiver decodes other SV's, then the computed intmsec will have the a common mode time error due to the error in setting the receivers local GPS-millisecond clock. However, because it is common mode, then this super millisecond time error can be observed. Such allows the clock to be observed and removed in the position fix.

It is important to define the time set error as having an integer millisecond part, and a part which is fractional defined to be ±0.5-millisecond. If the receiver position is calculated with a full PR's estimates from z-counts, then the super millisecond can be observed in the common mode clock bias solution of the GPS fix. The GPS millisecond counter is then adjusted to correct the error. The sub-millisecond portion is estimated in the fix. Most receivers don't move the millisecond location, but the bias estimate can be made available so that the exact time of the millisecond is still known. Because the error is common mode, the bias can be estimated to the accuracy of the position solution. If the position is accurate to 10 meters, then the time can also be set to that level, which is about 30-nanoseconds.

An SPS receiver with a data collection ability can compute is own position by forming total pseudorange and by receiving the satellite position information from the satellite signal. It can linearize the pseudoranges and estimate the position directly without any starting guess of time and position. The eGPS receiver also has this capability.

A important input for extended GPS fix operation is the accuracy of the SPS time clock in the SPS receiver. When the error is bounded, the range of positioning can be extended.

The mobile client 102 and 104 can be equipped with a number of methods for time maintenance between fix sessions.

An accurate real-time-clock (RTC) can be included in which a master clock remains powered while the rest of the receiver is off. In this mode, any clock bias is integrated from a propagating drift value, so the sub-millisecond portion of the bias can be maintained for long periods of time. (See, U.S. Pat. No. 6,714,160.)

A 32-kHz watch-type crystal can be kept powered while the master clock oscillator is turned off. For precision, the 32-kHz clock is always read on the receiver msec. To calibrate the RTC, the counter value is remembered at a specific-millisecond where the GPS time is known precisely after a fix. Then to use the RTC after the master clock power is restored, the counter is again read at a new-millisecond, and the difference in the counter values between the calibration step is added to the previous calibration time to obtain the current time. Both the super-msec time and sub-msec are estimated in this step. The advantage of this approach is that it requires less power than with the higher frequency master clock oscillator. The rate at which the error grows is mainly a function of temperature since this causes the frequency to change and the time error is the integral of the frequency error. It could be several hours or more before the time uncertainty grows past 5-millisecond. Uncertainties under 50-millisecond might be possible for a day of off time.

A time interval counter can be built in (See, U.S. Pat. No. 6,473,030). If another device connected to the GPS receiver has accurate time, then it can send a hardware pulse into the timeDiff circuit and the timeDiff will produce an accurate measurement of the time difference between the GPS-millisecond and external-millisecond. The other device will also send a message to the GPS of the time of the pulse. This way, after the GPS receiver has been powered-off, it can be accurately reset from an external accurate time source. The accuracy is dependent on the aiding system accuracy. However, a precision on the order of the period of the master clock is possible. Thus, an error much below a millisecond is possible.

In another case, the eGPS system is completely off, but time is maintained elsewhere in the system. Time is then supplied as a function call rather than as a hardware interrupt. Such is generally considered less accurate as the message propagation time is dependent on the host CPU and operating system loading. The accuracy may not be better than 50-milliseconds.

Alternatively, time can be extracted from a satellites SPS data message (the z-count for GPS). As shown above, the accuracy is bounded by the position accuracy when the range is predicted to set the receiver time.

For each time set model, a time error model is formed that provides a conservative upper bound on the error magnitude. The source that is available and has the smallest uncertainty is chosen as the time source and determines the current time uncertainty (Tunc). The level of time uncertainty determines how and whether the fix can be performed.

If the time uncertainty is larger than ten seconds, then a fix is not attempted.

If the time uncertainty is more than 50-milliseconds and less than ten seconds, the a special fix method called the no-Z fix (U.S. Pat. No. 6,714,160) is employed that has an extra unknown to model the additional error in the linearization of the pseudorange caused by the satellite position error due to being computed at an inaccurate time. Thus there are five unknowns rather than the classic four unknowns of three dimensional position and the clock bias. The cost of this time error is that an additional independent measurement is required to estimate the receiver position.

This zone is labeled TU4, where (50-millisecond<Tunc<10 seconds).

If the time uncertainty is less than 50-milliseconds, then the classic four unknown linearization of the pseudorange is used where there is not an additional term to account for the satellite position error.

Assuming four time uncertainties (Tunc) of the time error.

| TU4 | 50-millisecond < Tunc <= 10-millisecond |
| TU3 | 10-millisecond < Tunc <= 50-millisecond |
| TU2 | 5-millisecond < Tunc <= 10-millisecond |
| TU1 | Tunc <= 5-millisecond |

The selection of Tu3, Tu2, and Tu1 will be shown to depend the 0.25 and 0.5 wavelength of the 20 millisecond data bit.

Now that the time error zones have been defined, the extended fix strategy can be presented as a function of the combination of the time and position uncertainty zone.

Four zones of horizontal position uncertainty are defined around the most recent position estimate according to the position uncertainty (Punc). The position can be the most recent computed fix, or an externally supplied approximate location.

Each position source has a conservative model of how Punc is grown. The uncertainty from a previous position or breadcrumb grows according to the maximum user velocity model times the time since the fix or the indication of the breadcrumb identity. The uncertainty from a reference point or breadcrumb does not grow above its normal tracking range uncertainty as long as the reference identity is still indicated. Otherwise, the uncertainty grows at the same conservative rate of the maximum user velocity model. At the start of a session, the source with the smallest uncertainty is chose as the source of the approximate position. Also, during a session, new identifiers will also be checked to see if they provide a smaller uncertainty than the current uncertainty.

Assuming for relative fix zones based on position uncertainty:

| FUZ1 | larger than 5-msec (Punc > 1500 m) |
| FUZ2 | less than 5-msec but more than 0.5-msec (150-km < Punc <= 1500 m) |
| FUZ3 | less than 0.5-msec but more than 0.25-msec (75-km < Punc <= 150 m) |
| FUZ4 | less than 1/4-msec (Puns < 75-km) |

Fuz1: the Sub-75-km Zone

In this zone the position error is known to ±0.25 of a millisecond. Such is maximum position uncertainty at which the ±0.5 millisecond ambiguity in the clock bias can be observed. A smaller bias uncertainty would mean a larger position uncertainty can be tolerated. A simple wrap check can be used to properly un wrap the non-linear wrapping of the receiver clock bias in the codephase measurement. The codephase with the smallest absolute value is chosen as a pivot. The codephase to any non-pivot satellites is adjusted up by one millisecond if the codephase is less than −0.5-millisecond from the pivot. Similarly, the codephase is adjusted down by one millisecond if the codephase is more than 0.5-millisecond from the pivot. Such is called the pivot method to unify the codephases to a common millisecond clock contribution.

If time can be set using a Type-1 measurement in this zone, then the time uncertainty must also be less than ±0.25 millisecond in TU1. It is often true that there is at least one satellite with a less obscured path that can yield a Type-1 measurement. Otherwise, the time source must be from an RTC or external time source.

In FUZ1, a position can be computed with either the no-Z fix if Tunc=TU4 or the classic fix if Tunc is lower TU4.

Fuz2: the Sub-150-km Zone

In this zone the position error is known to ±0.5 of a millisecond. At this level of uncertainty it is not possible to also resolve ±0.5 millisecond ambiguity in the clock bias with the pivot method used in Fuz1. A method called the grid search is employed in this region. A grid of candidate positions is formed around the approximate position with a radius of 150-km where there is at least one point within a distance of 75-km of the true position. At this accuracy, the bias can be properly unwrapped with the pivot method described above. To detect the best grid, a test statistic is formed that contains the sums of squares of a double differences of predicted fractional range minus codephase so that the bias is cancelled. Before squaring, any double differences larger in magnitude than 0.5-millisecond are adjusted by the proper + or − one millisecond to produce a wrap with magnitude less than 0.5-millisecond. Often, a smaller grid spacing helps locate the best grid position when the geometry is problematic and there are other nearby minima that are not the global minima but can appear as the minimum when the grid spacing is large.

After the best grid point is located, the codephases are adjusted with the pivot method of FUZ1.

If time can be set using a Type-1 measurement, then the time uncertainty must also be less than ±0.5 millisecond and thus in TU1. Otherwise, the time source must be from an RTC or external time source.

In FUZ2, a position can be computed with either the no-Z fix if the Tunc=TU4 or the classic fix if the Tunc is lower TU4.

Experiments demonstrated the how the clock bias effects the ability to fix with different amount of position error. A simple pivot method was used to un-wrap the codephase ambiguity. At each grid point, the difference between the predicted fractional range and the measured codephase was formed. Then the satellite with the smallest absolute value was chosen as the pivot. As a way to verify the correctness of the pivot, the integer millisecond range was wrapped according to the pivot outcome for each satellite. If the adjusted integer millisecond was equal to the true integer millisecond range, then the wrapped sub millisecond linearized measurement was correct at the grid point. If the adjusted integer millisecond was wrong, then the position was wrong by a large amount because the measurement error was then one millisecond or 300-km. With different cases for the clock bias, it was seen that only the position that has an error less than 75-km (¼-millisecond=FUZ1) will properly wrap the codephase minus fractional range estimate. When the error was larger than 75-km, but less than 150-km (FUZ2), the bias was not properly unwrapped as was the case for when the position error was greater than 150-km (>0.5-millisecond=FUZ3), even when the bias was zero.

The wrapped differences were manipulated to form a test statistic. For each difference, the next difference was used as a pivot. Then the difference was adjusted by a millisecond if the absolute value of the difference was larger than 0.5 millisecond. The test statistic was the square root of some of squares of the wrapped and pivoted differences.

The position that was within 75-km always had the smallest statistic, so the best grid location could be properly identified. Secondly, grid points that were further than 150-km could provide an even smaller test statistic that the best, most accurate position. Such was because the wrapping process allowed the larger error to be hidden. However, this was easily detected since the grid point was further than 150-km from the center, and thus, exceeds the position uncertainty. Such is why it is important that the Punc estimate be very conservative. If the true error is larger, then the grid test can fail.

In a first experiment the clock bias was set to zero. The measured codephase was equal to the true fractional phase. The adjusted integer millisecond ranges were correct and the smallest test statistic within 150-km of the true position was the smallest.

Next the bias was increased to 0.25 of millisecond. Even with this smaller bias, the grid point in both FUZ2 and FUZ3 fail, but FUZ1 works properly.

| Truth | SV | bias = 75000 | | fractional range | | |
|---|---|---|---|---|---|---|
| | | intRange | fractional range | plus bias | codephase | measIntms |
| | 1 | 69 | 169276 | 244276 | 244276 | 69 |
| | 2 | 72 | 63541 | 138541 | 138541 | 72 |
| | 3 | 74 | 25430 | 100430 | 100430 | 74 |
| | 4 | 77 | 50668 | 125668 | 125668 | 77 |

| Grid | SV | intRange | fractional range | diff = codePhase − fractional range | pivot | diff-pivot | wrap | adjusted intRange | ERROR | wrapped diff | wrapped double diffs squared |
|---|---|---|---|---|---|---|---|---|---|---|---|
| 1 | 1 | 69 | 161260 | 83016 | 56210 | 26806 | 0 | 69 | 0 | 83016 | 440524484 |
| 1 | 2 | 72 | 76513 | 62028 | 56210 | 5818 | 0 | 72 | 0 | 62028 | 1266650349 |
| 1 | 3 | 74 | 2812 | 97618 | 56210 | 41408 | 0 | 74 | 0 | 97618 | 1714609469 |
| 1 | 4 | 77 | 69459 | 56210 | 56210 | 0 | 0 | 77 | 0 | 56210 | 718587724 |
| | | | | | | | | | | testStat = | 64346 |
| 2 | 1 | 69 | 163341 | 80935 | −10186 | 91121 | 0 | 69 | 0 | 80935 | 8302999892 |
| 2 | 2 | 72 | 148727 | −10186 | −10186 | 0 | 0 | 72 | 0 | −10186 | 17569448156 |
| 2 | 3 | 73 | 243166 | −142736 | −10186 | −132550 | 0 | 73 | 1 | −142736 | 15512024730 |
| 2 | 4 | 77 | 93159 | 32509 | −10186 | 42695 | 0 | 77 | 0 | 32509 | 2345020765 |
| | | | | | | | | | | testStat = | 209116 |
| 3 | 1 | 69 | 57439 | 186837 | −106950 | 293787 | −1 | 68 | 1 | −112956 | 917223396 |
| 3 | 2 | 71 | 281782 | −143241 | −106950 | −36291 | 0 | 71 | 1 | −143241 | 56268049 |
| 3 | 3 | 73 | 236170 | −135740 | −106950 | −28790 | 0 | 73 | 1 | −135740 | 828846332 |
| 3 | 4 | 77 | 232619 | −106950 | −106950 | 0 | 0 | 77 | 0 | −106950 | 36062407 |
| | | | | | | | | | | testStat = | 42877 |

The bias was increased to 0.5-millisecond. The grid point in FUZ1 correctly wrapped the codephase and had the smallest test statistic.

| Truth | SV | bias = −250000 | | fractional range | | |
|---|---|---|---|---|---|---|
| | | intRange | fractional range | plus bias | codephase | measIntms |
| | 1 | 69 | 169276 | −80724 | 219069 | 68 |
| | 2 | 72 | 63541 | −186459 | 113333 | 71 |
| | 3 | 74 | 25430 | −224570 | 75223 | 73 |
| | 4 | 77 | 50668 | −199332 | 100461 | 76 |

| Grid | SV | intRange | fractional range | diff = codePhase − fractional range | pivot | diff-pivot | wrap | adjusted intRange | ERROR | wrapped diff | wrapped double diffs squared |
|---|---|---|---|---|---|---|---|---|---|---|---|
| 1 | 1 | 69 | 161260 | 57809 | 31002 | 26806 | 0 | 69 | −1 | 57809 | 440524484 |
| 1 | 2 | 72 | 76513 | 36820 | 31002 | 5818 | 0 | 72 | −1 | 36820 | 1266650349 |
| 1 | 3 | 74 | 2812 | 72410 | 31002 | 41408 | 0 | 74 | −1 | 72410 | 1714609469 |
| 1 | 4 | 77 | 69459 | 31002 | 31002 | 0 | 0 | 77 | −1 | 31002 | 718587724 |
| | | | | | | | | | | testStat = | 64346 |
| 2 | 1 | 69 | 163341 | 55727 | 7302 | 48425 | 0 | 69 | −1 | 55727 | 8302999892 |
| 2 | 2 | 72 | 148727 | −35394 | 7302 | −42695 | 0 | 72 | −1 | −35394 | 17569448156 |
| 2 | 3 | 73 | 243166 | −167944 | 7302 | −175245 | 1 | 74 | −1 | 131849 | 15512024730 |
| 2 | 4 | 77 | 93159 | 7302 | 7302 | 0 | 0 | 77 | −1 | 7302 | 2345020765 |
| | | | | | | | | | | testStat = | 209116 |
| 3 | 1 | 69 | 57439 | 161629 | −132158 | 293787 | −1 | 68 | 0 | −138163 | 917223396 |

-continued

| | | | | | | | | | | | |
|---|---|---|---|---|---|---|---|---|---|---|---|
| 3 | 2 | 71 | 281782 | −168449 | −132158 | −36291 | 0 | 71 | 0 | 131344 | 56268049 |
| 3 | 3 | 73 | 236170 | −160948 | −132158 | −28790 | 0 | 73 | 0 | 138845 | 828846332 |
| 3 | 4 | 77 | 232619 | −132158 | −132158 | 0 | 0 | 77 | −1 | −132158 | 36062407 |
| | | | | | | | | | | testStat = | 42877 |

The clock bias wrapping affects the position estimation. If the bias is allowed to grow beyond the normal definition of ±0.5-millisecond, an interesting phenomenon occurs. In the first case, the bias was extended to 250,000 m (⅚-millisecond). The integer-milliseconds ranges were still correct, but the other points experienced large errors.

In another example, the bias sign was changed. All the integer millisecond ranges were wrapped the wrong way, but by the same amount. Such produced a common mode error that did not affect the position. However, the time would was set wrong by one millisecond. The other grid points fail to compute position properly.

When only codephase is available, and no other measured satellite timing information can be obtained, then it is not possible to observe the super millisecond time errors in the process of the position fix. For weaker signals where the measurement noise is higher, position accuracy is only affected when the time error becomes more than about 50-millisecond. Beyond this time uncertainty, a no-Z fix strategy is needed to handle the effect of this time error. For stronger signals, the z-count can be observed and the time error is significantly smaller. An embedded A-GPS receiver that receives accurate time does not need to deal with this problem. The eGPS approach has to work harder to produce the same result as an A-GPS receiver. But, the eGPS receiver is a more independent and has the advantage that it works without the deep cellular infrastructure aiding.

Fuz3: the Sub-1500-km (<5-Millisecond) Zone

In this zone the position error is known to ±5-milliseconds or ±1500-km. Such is where the measured data bit phase (BTT) or z-count is used to extend the non-ambiguity range of the predicted total pseudorange beyond the range of the codephase measurement.

If there are three or more Type-1 measurements, then total pseudorange is completely measured and a position can be computed independent of the position uncertainty and time uncertainty.

In the extended GPS cases below, it is assumed that there are not at least three Type-1 measurements. The position availability depends on the combination of the time error and position error uncertainties.

For the Mixed Type-1 and Type-2 case, if there is at least one Type-1 measurement, and enough Type-2 measurements so that a total of at least three is available, then a position can be computed independent of the starting time uncertainty because the Type-1 SV will set time to better than 5-milliseconds. The ambiguity function will always be less than 10-millisecond so accurate $N_{set}$ is always provided. The total pseudorange can be estimated for the Type-2 SV's when ever there is a Type-1 measurement and the position uncertainty is less than 5-millisecond.

For the Type-2, TU2 case, if there are at least three Type-2 measurements and Tunc=TU2 (Tunc<5-millisecond), then the total pseudorange can be estimated for ALL the Type-2 measurements for the same reason that the ambiguity function cannot be greater than 10-millisecond.

For the Type-2, TU3 case, if there are at least three Type-2 measurements and Tunc=TU3 (5-millisecond<=Tunc<10-millisecond), then the total pseudorange can be estimated for ONLY the i-th Type-2 measurements if the ambiguity function Tunc+range uncertainty(i)<10-millisecond, where each of these uncertainties are positive.

A procedure to determine if the range uncertainty is less than the margin of (10-Tunc) for the given position uncertainty is used to form a circle of positions that defines a surface on the Earth with a radius of Punc with respect to the center of the surface at the approximate position. If the satellite range difference between the approximate position and the grid position is less than (10-Tunc), then the total pseudorange can be estimated for this satellite without ambiguity for a Type-2 measurement.

Summarizing, the pseudorange can be estimated for the i-th Type-2 measurement if the ambiguity for the i-th satellite:

|Rgrid(i)−Rcenter(i)|<(10-Tunc) for all points around the approximate position at a radius of Punc.

Fuz4: the Super-1500-km (>5-Millisecond) Zone

In this zone, the position uncertainty is estimated to be larger than ±5-milliseconds or ±1500-km. Here again the BTT or the z-count is needed to extend the non-ambiguity range of the total pseudorange beyond the range of the codephase measurement.

Whereas there is a case in Fuz3 with Tu2 where the solution always exists, the ability to compute $N_{set}$ for the Type-2 measurements in this region always depends on the satellite geometry.

If there are three or more Type-1 measurements, then total pseudorange is completely measured, and a position can be computed independent of the position uncertainty and time uncertainty.

In the extended GPS cases below, it is assumed that there are not at least three Type-1 measurements. The position availability depends on the combination of the time error and position error uncertainties.

For the Mixed Type-1 and Type-2 case, if there is at least one Type-1 measurement, and enough Type-2 measurements so that a total of three is available, then a new ambiguity test called the SV time set ambiguity function is required on each satellite to determine if $N_{set}$ can be predicted confidently.

When time is set with the Type-1 measurement, the usability of the Type-2 satellite depends on whether all points pass the SV time set ambiguity test within a radius of the position uncertainty Punc. The ambiguity test on the i-th Type-2 measurement is: Trust $N_{set}$ if: |[Rgrid(i)−Rcenter(i)]−[Rgrid(TS)−Rcenter(TS)]|< 10 for all points inside and around the approximate position at a radius of Punc.

The biggest protection radius for Punc occurs when the time set SV and the $N_{set}$ SV have the largest dot product. Thus, it should be clear that if there are two Type-1 SV's, then the dot product should be calculated for both possibilities of the time set SV and $N_{set}$ should be predicted with the time set SV that makes the largest dot product. Said another way, all Type-2 measurements need not use the same Type-1 to determine N. However, after N is determined, only one Type-1 SV should be used to adjust the BTT to GPS time for all measurements. Such ensures that the time error is common mode on all measurements in the position fix.

For the Type-2, TU2 or TU3 case, if there is no Type-1 measurement but there are at least three Type-2 measurements, then the method is the same for both Tunc=TU2 squared statistic with M-N degrees of freedom.) With the 2-step self-aiding approach, other Type-3 measurements can be added to make the solution over determined and add integrity. The advantage here is that satellite is not skipped when it fails the Punc surface.

Table of Extended Fix Zone Methods
Assume if at least Type-1 SV's are available, then step 1, do full pseudorange fix. If additional Type-2 or Type-3, then step 2 do a second FUZ1 or FUZ2 fix

| FixZone | FUZ1 | FUZ2 | FUZ3 | FUZ4 |
|---|---|---|---|---|
| Punc(-millisecond) | (¼-millisecond) | (0.5-millisecond) | (<5-millisecond) | (>5-millisecond) |
| Punc(-km) | <75-km | <150-km | <1500-km | >1500-km |
| Meas Pre-process method | Simple pivot method for bias | Grid search then simple pivot method for bias at best grid loc | Construct $N_{set}$ for Type-2 SV's | Construct $N_{set}$ for Type-2 SV's |
| TU1 Tunc <5-millisecond | Time from: RTC or Type-1 SV X Type-1, Y Type-2, Z Type-3 (X + Y + Z) >= 3 | Time from: RTC or Type-1 SV X Type-1, Y Type-2, Z Type-3 (X + Y + Z) >= 3 | Time from: RTC or Type-1 SV X Type-1, Y Type-2, (X + Y) >= 3 | Time from: RTC or Type-1 SV X Type-1, Y Type-2, (X + Y) >= 3 |
| Fix method: classic fix | | | No ambiguity test needed | Use SV time set ambiguity test to find SV's that pass at radius Punc |
| TU2 5-millisecond < Tunc < 10-millisecond | Time from: RTC Y Type-2, Z Type-3 (Y + Z) >= 3 | Time from: RTC Y Type-2, Z Type-3 (Y + Z) >= 3 | Time from: RTC Y Type-2 Y >= 3 | Time from: RTC Y Type-2 Y >= 3 |
| Fix method: classic fix | | | Use RTC ambiguity test to find SV's that pass at radius Punc | Use RTC ambiguity test to find SV's that pass at radius Punc |
| TU3 10-millisecond < Tunc < 50-millisecond | Time from: RTC Y Type-2, Z Type-3 (Y + Z) >= 3 | Time from: RTC Y Type-2, Z Type-3 (Y + Z) >= 3 | Time from: RTC Need 3 Type-1 SV's | |
| Fix method classic fix | | | | |
| TU4 50-millisecond < Tunc < 10 sec | Time from: RTC Y Type-2, Z Type-3 (Y + Z) >= 3 | Time from: RTC Y Type-2, Z Type-3 (Y + Z) >= 3 | | |
| Fix method No-z fix | | | | |

(Tunc<5-millisecond), and TU3 where Tunc<10-millisecond. In this case, the confidence for each satellite is evaluated with RTC ambiguity function as described in FUZ3.

In a weaker environment, the extended fixes first process a minimal set of the Type-1 or Type-2 measurements. In the case of high geometric-dilution-of-precision (PDOP), the accuracy may not be suitable for a high accuracy fix. However, even if the error is high, this fix can serve a valuable purpose of reducing the position uncertainty to a level where remaining Type-3 measurements can be processed in a second fix. Only codephase is needed in the region where the error is <75-km or <150-km, so FUZ1 or FUZ2 methods can be used. This is the same as the self-aiding fix.

Another strategy to extend the range for each satellite is to allow multiple values of N, since generally N can only be 3, 4. All the candidate position solutions are formed from all measurement combinations when some satellites have more than one. If the solution is over determined, more measurements than unknowns, then the one with the minimum sums of squares of a-posteriori measurement residuals (ARR) is isolated as the best solution. (This well known APR is a chi- Conventional cell-based communication modems, such as the ENFORA GSM modem allow access to the Internet through a cellular network operator. An SPS receiver can be integrated with an Enfora GSM modem to allow connection to the SPS server. These modems do not provide access to "inside-the-infrastructure" information that is available to an A-GPS subscriber through the cell-based information source. The "outside-the-infrastructure" client cannot receive the cell station position as taught in the Krasner '290 patent.

Fortunately, the cellular base station identity and location area code (cell-ID and LAC) are two examples of identifiers that are in the GSM signal definition that are commercially available data. The cell-ID is intended to be a locally unique code, but may not be globally unique. The location area code contains more general information about the country of operation, a region inside the country, and a code to identify the cellular operator or provider. While there is no guarantee that the cellular operators will have unique cell-ID's, the combination of the cell-ID and location area code would better provide a unique identity in a given region that is accessible. However, additional methods might be required to guarantee uniqueness and avoid ambiguity.

First of all, like a conventional SPS receiver, the eGPS receiver has a separate low cost oscillator as a frequency source for signal downconversion and sampling, and a 32-kHz watch-like low power oscillator to maintain accurate time between positioning sessions. It can fix any time independent of access to a cellular network for time and frequency information.

Secondly, it has the ability in hardware and software to demodulate the SPS data message. The timing information allows the receiver to measure total pseudorange and thus, determine its position autonomously without aiding. Furthermore, it can also collect satellite position information needed in the receiver position calculation.

In the process of determining the message data, it must also determine the data bit phase or the so-called bit transition time (BTT) that indicates the received fractional phase of the data message bit. For GPS, the 50-bits per second data bit rate yields a period of 20-milliseconds. A typical total range is 60-85-milliseconds. Such range can also be expressed as 3 or 4 integer data bits, plus 0-19 fractional data bit range (BTT).

Also, BTT can be measured at a much weaker signal level than the timing message. The timing message requires every bit to be observed correctly which is difficult with a signal below −145 dBm as the noise in even a 20-millisecond interval can be occasionally stronger than the signal. However, because each data bit transition produces an independent BTT measurement, and there are up to 50 bit transition per second, these measurements can be combined over a long period of time. A BTT estimated over 1-15 seconds can allow an accurate BTT measurement down to a signal level of −150 dBm. Also, only a high sensitivity receiver like the mobile client 102 can track the frequency at this signal level so that frequency error is maintained under half of the message data rate.

Combined with a previously computed receiver position, the measured data bit phase BTT can be used to estimate the total pseudorange when the position and timing uncertainty are each less then one forth of the BTT range, or when the line of sight effect of each is less than ten-milliseconds. Thus, in degraded conditions where the timing message cannot be reliably demodulated, the BTT can be used to predict a pseudorange and allow a positioning capability of at least ±1500-km and generally higher from a previous position.

If the signals are too weak to provide BTT, then the position can still be computed within ±150-km with a grid search method that allows the ambiguity effect of the SPS receiver clock time error to be eliminated from the fractional pseudorange measurements. The grid search isolates a position that is within ±75-km and then a simple wrap check is sufficient to remove the any wrap of the sub millisecond clock offset so that the clock offset is common mode in all measurements.

Thirdly, if signal conditions are degraded, it can also request SPS satellite data from the SPS data server. The data sent by the server are in the form of a reduced size model so that the accuracy is degraded slightly from the true ephemeris to avoid infringement of complete ephemeris aiding patents.

The net effect is that the eGPS receiver greatly extends the range of a conventional GPS receiver with connection through the Internet to a GPS server that is not tied to the cellular infrastructure or the cellular network's cell-based information source.

In a tracking system application, the system is configured with three time intervals to maintain high sensitivity but with a low connection rate to an aiding server. The first interval is called Tfix and describes the regular period at which a position is attempted. The Tfix may be selected for maximum sensitivity. In this case, the Tfix is related to the time it takes for the position uncertainty to grow to ±150-km, since this is the limit of using the last position as the approximate location in the most difficult (weakest) signal environment where measuring total pseudorange is impossible. For an application in Japan, the bullet train dictates the maximum user velocity of around 300-km/hr. Thus, it only takes 30 minutes to exceed the 150-km range. Thus a Tfix of 10 minutes provides three chances that a fix can be made in the worst signal environments before the 150-km uncertainty is encountered. It is implied that receiver will only attempt a fix for a duration Ton, typically a few minutes, to avoid consuming power when the conditions are too tough for a fix.

The second interval is Tdata defines how often the eGPS receiver makes connect to the position registration server 108 for satellite position information. Typically a collected ephemeris is good for four hours before the accuracy deteriorates. Thus, a typical rate is every two hours. To reduce data traffic, the eGPS receiver can chose to request only those ephemeris that it has not been able to collect recently.

The Treport defines how often the position results are reported to an application or back to the server. If Tfix is set much lower than Treport, the system can be configured to send all, or fewer points, e.g., the last point, or average point. A tracking application may only want to know the position once a day. In another application an alert is sent when the receiver leaves a designated area. Thus, it may have a fast fix rate to check the situation frequently, but only report if the alert criteria is met. In this case, Treport may also be used to trigger a "still alive" message needed to know the system is still operating properly.

For a mobile client 102 where the position requests are under human control, the Tfix may still be active in the background to keep the position uncertainty from growing unbounded, or it may also be set to never activate, so that the user has complete control of the positioning requests. The user will always have control over whether "breadcrumbs" will be shared with the server. A mobile client 102 whose position is computed locally will have inherently better privacy if its applications don't share their positions with applications that run on the server. The data requesting interval can also be adjustable by the user. Periodic data retrieval will reduce waiting time on position session activated by the user if the eGPS receiver already has current satellite data and local "breadcrumbs".

If the receiver is in open sky or degraded conditions, the eGPS receiver will generally be able to fix without any aiding. Aiding in this environment can speed up the fix time, but it is not needed to enable the fix. In eGPS however, if the signals are weak and the SPS cannot receive enough timing information from the satellites it can track, then its ability to fix is dependent on the position uncertainty that grows as a function of the time since the last position calculation. EGPS can extend operation in this area because it can do a very wide autonomous relative fix around the last position with the satellite data bit timing information from as little as three satellites at or above −150 dBm. Without this requisite additional satellite timing, the eGPS receiver without "breadcrumbs" can only operate within 150-km of uncertainty from its last fix. Even if the position uncertainty grows large, the frequency search can always be expanded to a point where acquisition is still possible. The only cost is a reduced acquisition time. But the real detriment of a high position uncertainty is the necessity to receive additional timing information from the SPS satellites besides the codephase to resolve the total pseudorange. When the uncertainty is too high and satellite timing is not available, then even though the receiver is able make the fractional pseudorange measurements, it still cannot fix because it cannot predict the total pseudorange without ambiguity.

Because the distance from a tower is never more than 150-km, the A-GPS receiver has the advantage that it can fix anytime independent of the signal level as long as the communication receiver is in contact with the cellular network that has a cell-based information source However, this requires an extensive monitoring of the cell base stations and may not provide ubiquitous operation across networks where the operators have not installed the cell-based information source.

One way to greatly improve the situation is to have reference positions where the receiver has already computed a location and to know when the receiver is again nearby that region so as to permit a relative fix when an autonomous fix is not possible.

Such a reference location is a "breadcrumb", and reception of such information causes the eGPS receiver to search around this point up to a 150-km uncertainty and then use its grid search fix algorithm to fix using only fractional pseudorange information at the closest grid location. Thus, timing information to form total pseudorange is not required. Such means positioning is possible even in the weakest signal conditions when the SPS timing data message cannot be reliably received.

One method of storing and retrieving "breadcrumbs" is for the client to save and name reference positions in a database. Then later when the client returns to the vicinity of that breadcrumb, it can improve the ability to fix in that region by indicating to the receiver that it is near a stored reference point.

Another approach is to associate a name with a unique and specific city, town, or point of interest in a global sense. Such large database would be available at the server. The user can search through a directory of unique places, and if the user indicates they are in the proximity of this named identifier, and the reference position for breadcrumb can be retrieved from database, then the user does this to get a high sensitivity fixes capability in this vicinity. Continued indication of proximity via a button push keeps the position uncertainty from growing after the breadcrumb is received.

A further method embodiment of the present invention uses the cell base station to identify a "breadcrumb". If the user is able to get a fix and then read this cell-ID in a reasonable period around the fix, it can then associate this cell-ID with the previous position. Thus at a later time, if it can read that ID, then it can recall this position from its database or the server and the receiver can then get its highest sensitivity in this region.

For certain types of "breadcrumbs", a small uncertainty can associated with the location. For example being in a small suburb, or at a small point of interest, or being near a cellular base station produces a small uncertainty about the distance between the true location and the center of the point of interest.

Also, in the case of cell sites, the ID may be read some time after the last SPS receiver fix. In the fast-moving Bullet Train case, a new cell site encountered five minutes after a previous GPS fix would have an associated uncertainty of (cellRange+ 300-km/hr*5/60)=cell range+5-km.

It can also share its "breadcrumbs" and identifier with other clients so that it can also receive the "breadcrumbs" from other users and expand its own database.

Embodiments of the present invention can take many forms. For example, a method of operating the mobile client 102 to extend its capabilities is firstly to obtain the most timing information possible from the SPS signals, even in weak signal conditions. This in order to fix autonomously from with the highest level of uncertainty in its starting position. Secondly, when it is able to fix, it updates a database of fresh reference points and identities. These are thereafter used as approximate starting locations on subsequent fix sessions started in the vicinity of the same reference point.

A method for extending the position capability of an SPS receiver includes computing a fix with at least three Type-1 measurements, regardless of position uncertainty. Then, computing a position fix if there is at least one Type-1 SV and enough other Type-2 SV's so that there are at least 3 SV's with total pseudorange. Same as saying at least one SV with a z-count and then enough others with measured data bit phase (BTT). If no Type-1's are available, computing a position fix if there is at least three Type-2 SV's and an accurate local real time clock. Same as saying at least three SV's with measured data bit phase BTT. Then, determining a total pseudorange using a codephase, a measured fractional data bit (BTT) and a predicted number of data bits based on an approximate location. Then, determining a predicted number of data bits where time is set by either reception of satellite time message or an accurate local real time clock. And, determining a predicted number of data bits with a measurement of the fractional data bit phase. The data bit phase is estimated with a long term histogram to improve the sensitivity so that the phase can be estimated for a weaker satellite. An ambiguity function is used to determine the confidence in an estimated number of data bits.

Multiple candidates are computed for the number of data bits and then forming multiple full-pseudorange position fixes candidates. The best candidates are selected for each satellites based on a test statistic when the full pseudorange fixes are over determined. The test static is the minimums sums of squares of a posteriori measurement residuals (APR).

The section of the best candidates for N for each satellite is based on adding remaining Type-3 measurements to produce an over determined fix and then using the APR test statistic. An SV time set ambiguity function is used to determine the confidence in N when time is set from the received time message from at least one satellite (a Type-1 measurement). An RTC ambiguity function is used to determine the confidence in N when time is set from a local real time clock. A second step position calculation is used to add integrity and accuracy by adding Type-3 measurements to the fix that could not be processed in a first full pseudorange based position calculation step when the position uncertainty after the first step is reduced to the range of ambiguity of the codephase.

FIG. 3 represents a navigation receiver method 300 for extending fix ranges under weak signal conditions. Method 300 comprises a step 302 for directly receiving a navData message and code from an orbiting navigation satellite. A codephase measurement is made with a half cycle ambiguity of one-millisecond about equal to a range 150-km, and the navData message that has data bit wavelength of 20-milliseconds and a half cycle ambiguity of 10-milliseconds about equal to a range 1500-km. A step 304 accepts any parity errors in the navData message that otherwise would prevent decoding. A step 306 extracts a data bit phase from the phase-reversals of the navData message so the range of position in weak signal conditions can be extended from the range of the codephase at 150-km out to 1500-km. A decision 308 tests when a time-stamp is not available, but a measured phase of a bit transition time ($BTT_m$) and codephase are available. A step 310 then estimates the number of data bits $N_{set}$ by equating a predicted range to a measured range. A position solution can then be output. When combined with a previously computed position, the measured data bit phase $BTT_m$ is used to estimate total pseudoranges when a position and timing uncertainty are each less then one-fourth of the BTT range, or when a line of sight effect of each is less than ten-milliseconds for degraded conditions where the timing message cannot be reliably demodulated, to allow a positioning capability of at least ±1500-km from a previous position. In a step 312, after being able to position fix by obtaining a maximum of timing information possible from an SPS signal in weak signal conditions, e.g., to autonomously fix with a highest level of uncertainty in its starting position, then a database of fresh reference points and identities are updated and thereafter consulted by other mobile navigation clients as approximate starting locations in subsequent fix sessions started in a same reference point vicinity.

The step of receiving 302 uses a locally generated reference frequency accurate to within half of the navData bit rate of the true frequency to observe navData databit phase reversals. Typically, a high sensitivity code and frequency tracking loop is driven by a strongest signal from a search window with a multitude of codephase and frequencies hypotheses from long noncoherent integrations times, and is such that the frequency spacing between hypotheses is small enough to reduce the frequency error, and the inputs to a $BTT_m$ estimator are the consecutive inphase and quadrature correlation results at the code and frequency loop state.

The step of receivihg 302 is such that a histogram with several elements is used to integrate counts of events when the dot product at a given BTT hypothesis is negative, and the $BTT_m$ is declared found when the histogram count at a particular $BTT_m$ hypothesis reaches a confidence value above the other candidates. A $BTT_m$ location is converted to GPS time by associating a $BTT_m$ location with the sum of the codephase plus a GPS-millisecond counter adjacent to an epoch location of a winning $BTT_m$ histogram. After a $BTT_m$ is determined, the navData is demodulated by forming another dot product test statistic at a best hypothesis of a data bit phase; and FIG. 3 thus illustrates a navigation receiver method for extending its fix range under weak signal conditions from the ambiguity of the codephase range to the ambiguity of the codephase plus navData bit phase range. A navData message is directly received from an orbiting GPS navigation satellite that has data bit wavelength of 20-milliseconds and a half cycle ambiguity of 10-milliseconds about equal to a range 1500-km. When a time-stamp is not available, but a measured $BTT_m$ and codephase are available, then a data bit phase is extracted from the phase-reversals of the navData message, and the number of data bits $N_{set}$ is estimated by equating a predicted range to a measured range. A position solution can then be output.

When the starting combination of position uncertainty and time uncertainty exceed the ambiguity of the codephase measurement, a grid search technique can be to isolate an improved approximate location where the combination of position uncertainty and time uncertainty do not exceed the ambiguity of the codephase measurement.

A pivot wrap method can be used to unwrap the clock bias effect in the codephase when the combination of position uncertainty and time uncertainty do not exceed the ambiguity of the codephase measurement.

A fix interval Tfix is the first of a three interval system that maintains the position uncertainty below a level so that the codephase is adequate to measure the position change with no ambiguity.

A data request interval Tdata is the second of a three interval system at which time a reduced satellite position ephemeris is requested for any or all satellites from an position registration server 108 with the Internet via a cellular modem in order to ensure that the models are never older than their range of usability (typically 4 hours). This reduced model does not contain all the parameters of the transmitted ephemeris so that the accuracy is degraded slightly.

A data report Treport interval is the third of a three interval system at which the position is reported. A means of building a local database of breadcrumb reference points using the autonomous fix capability. After a fix is computed, the SPS receiver may request a cell station identity from the cellular modem being used to connect to the position registration server 108 via the Internet. Or the client can manually associate a specific unique name for the location.

Embodiments of the present invention share the local database with a master server database so that the master can build a database that is the union of all clients local database. The client can use the server to store and retrieve their lifetime specific "breadcrumbs". A configurable number of "breadcrumbs" can be obtained from the server so that the client will always have all the "breadcrumbs" that could be covered in the period until the next update.

The server (and or client) can filter algorithms on the database to handle non-unique "breadcrumbs" and inactive cell sites. The server (and or client) can filter algorithms on the database to improve the position estimate and an estimate of its common range of use. The server can include additional unique "breadcrumbs" of unique points of interests such as cities, tourist locations where there is a unique name for such a location. Positions for such "breadcrumbs" names are generated manually by operators at the position registration server 108 or by clients who send a position and a unique breadcrumb name. For example, "SFO" for San Francisco Airport. Receiving this breadcrumb assures good fixing capability inside the airport needed when someone is there to take them home.

At the start of a positioning session, a client can either receive a breadcrumb from the user database, or may read the cell-ID and request an approximate position from the GPS server. If the breadcrumb uncertainty is less than the user uncertainty, then the approximate position is adopted to set the FUZ.

The processing time to acquire at least one SPS satellite can be reduced using a cell-based communication receiver by, (1) obtaining a breadcrumb identity, (2) using a current or recent cellular identity, (3) using a unique breadcrumb name supplied by the user.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A mobile client for initializing quicker from a cold start if in a wireless service area, comprising:

a navigation receiver capable of fully autonomous position solutions from signals it receives directly from orbiting navigation satellites;

a wireless transceiver associated with the navigation receiver and able to provide Internet access within a wireless service area;

characterized in having:

an identity (ID) for use as a database index that can be uniquely associated with particular wireless service areas; and a fixed position previously determined by another mobile receiver and associated in a database with the ID functioning as an index to provide an initial starting location estimate of the navigation receiver to the navigation receiver when operating within said particular wireless service area.

2. The mobile client of claim 1, wherein:

the navigation receiver can request the fixed position of the particular wireless service area from an Internet-connected database previously determined by another mobile receiver if it provides said ID to use as an index.

3. The mobile client of claim 1, wherein:

the navigation receiver uses a fixed position of the particular wireless service area obtained from an Internet-connected database previously determined by another mobile receiver to more quickly determine a first position fix for the navigation receiver by reducing initial starting position uncertainties to less than 150-km.

4. The mobile client of claim 1, wherein:

the navigation receiver uses a fixed position of the particular wireless service area obtained from an Internet-connected database previously determined by another mobile receiver to enable a higher sensitivity search for signal by reducing initial starting position uncertainties to less than 150-km.

5. The mobile client of claim 1, further comprising:

a local memory storage accessible to the navigation receiver that can be queried for a fixed position of the particular wireless service area previously determined by another mobile receiver once a corresponding ID has been requested and obtained.

6. A navigation satellite receiver system, comprising:

a mobile client comprising an interconnected autonomous navigation receiver and a wireless transceiver;

an Internet server accessible to the mobile client by a wireless connection in a wireless service area supported by the wireless transceiver; and characterized by:

a database associated with the Internet server that accumulates and relates fixed positions corresponding to the wireless service areas according to an identifier (ID) for a particular wireless service area in which it is presently roaming and is obtainable by the mobile client.

7. The system of claim 6, wherein:

the mobile client can fetch a fixed position corresponding to the wireless service areas from the database to enable a position solution for the navigation receiver when signal conditions are too poor for complete direct demodulation of the navData.

8. The system of claim 6, wherein: the mobile client can contribute a fixed position it computed for itself inside the wireless service area by communicating it to the database, wherein later visitors to the same wireless service area can fetch it back to improve their ability to obtain a position solution when signal conditions are too poor for complete direct demodulation of the navData.

9. The system of claim 6, wherein:

the mobile client provides for the selection of a landmark name from the database and thereby receive a position from the database to improve their ability to obtain a position solution when signal conditions are too poor for complete direct demodulation of the navData.

10. The mobile client of claim 1, wherein:

the navigation receiver is enabled to provide quicker position fixes even in weak signal conditions by simultaneously inspecting any directly received codephase to resolve to within 150-km, and any directly received navData message bit phase to resolve to 1500-km; and a 50-Hz GPS navData message signal strength directly received by the navigation receiver can deteriorate to a point where parity errors start to occur, but their bit phase can still be measured.

11. The system of claim 6, further comprising in the mobile client:

a device for directly receiving from an orbiting navigation satellite a codephase measurement with a half cycle ambiguity of one millisecond about equal to a range 150-km, and phase reversals of the navData message that has data bit wavelength of 20-milliseconds and a half cycle ambiguity of 10-milliseconds about equal to a range 1500-km;

a device for accepting parity errors in said navData message that otherwise would prevent decoding;

a device for extracting a data bit phase from phase reversals of said navData message so the range of position in weak signal conditions can be extended from the range of the codephase at 150-km out to 1500-km;

a device for when a time-stamp is not available, but a measured phase of a bit transition time ($BTT_m$) and codephase are available, then estimating the number of data bits $N_{set}$ by equating a predicted range to a measured range; and a device for outputting a position solution;

wherein, when combined with a previously computed position, the measured data bit phase $BTT_m$ is used to estimate total pseudoranges when a position and timing uncertainty are each less then one-fourth of the BTT range, or when a line of sight effect of each is less than ten-milliseconds for degraded conditions where the timing message cannot be reliably demodulated, to allow a positioning capability of at least ±1500-km from a previous position.

* * * * *